US008990249B1

(12) United States Patent
Nogin et al.

(10) Patent No.: US 8,990,249 B1
(45) Date of Patent: Mar. 24, 2015

(54) REVISION CONTROL SERVER WITH SELF-HOSTING MULTI-LEVEL ACCESS CONTROLS AND USER NOTIFICATIONS

(75) Inventors: Aleksey Nogin, Fresno, CA (US); Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 956 days.

(21) Appl. No.: 12/460,511

(22) Filed: Jul. 20, 2009

(51) Int. Cl.
*G06F 17/30* (2006.01)

(52) U.S. Cl.
CPC ................................ *G06F 17/30067* (2013.01)
USPC .......................................................... 707/781

(58) Field of Classification Search
CPC . G06F 8/71; G06F 17/3023; G06F 17/30165;
G06F 17/30144; G06F 17/30067; G06F
17/30309; G06F 17/30356; G06F 17/30377;
G06F 17/30943; G06F 21/6227; G06F 11/263;
G06F 11/3668; G06F 11/368
USPC .......................................................... 707/714
See application file for complete search history.

(56) References Cited

U.S. PATENT DOCUMENTS

| | | | | |
|---|---|---|---|---|
| 4,558,413 A | * | 12/1985 | Schmidt et al. | 717/170 |
| 4,912,637 A | * | 3/1990 | Sheedy et al. | 1/1 |
| 5,481,722 A | * | 1/1996 | Skinner | 717/122 |
| 6,223,343 B1 | * | 4/2001 | Hopwood et al. | 717/101 |
| 6,681,382 B1 | * | 1/2004 | Kakumani et al. | 717/122 |
| 7,467,198 B2 | * | 12/2008 | Goodman et al. | 709/223 |
| 2004/0049520 A1 | * | 3/2004 | Bowers et al. | 707/104.1 |

OTHER PUBLICATIONS

C. Michael Pilato, Ben Collins-Sussman, and Brian W. Fitzpatrick, "Version Control with Subversion," Edition 2, revised, Publisher O'Reilly, 2008, ISBN 0596510330, 9780596510336.

Ngo, L.; Apon, A., "Using Shibboleth for Authorization and Authentication to the Subversion Version Control Repository System," Information Technology, 2007. ITNG '07. Fourth International Conference on , vol., no., pp. 760-765, Apr. 2-4, 2007.

Zhang, X., Nakae, M., Covington, M. J., and Sandhu, R. 2006. "A usage-based authorization framework for collaborative computing systems," In Proceedings of the Eleventh ACM Symposium on Access Control Models and Technologies (Lake Tahoe, California, USA, Jun. 7-9, 2006), SACMAT '06. ACM, New York, NY, 180-189.

* cited by examiner

*Primary Examiner* — Sheree Brown
(74) *Attorney, Agent, or Firm* — Tope-McKay & Associates

(57) ABSTRACT

Described is a system for managing a multi-user revision control repository which provides multi-level access control. The present invention describes creating configuration files which describe a set of management states of management areas of a repository. The configuration files describe access control to a set of management areas, and the set of management states is stored in the repository to create a self-hosting management implementation. A new commit is processed to the repository by contacting a revision control repository server with a client software, communicating a user's new revision to the revision control repository server, verifying the user's authentication and authorization prior to collecting a new revision with the revision control repository server, and executing a custom script configured to run on the revision control repository server.

18 Claims, 5 Drawing Sheets

REVISION CONTROL SERVER WITH SELF-HOSTING MULTI-LEVEL ACCESS CONTROLS AND USER NOTIFICATIONS

BACKGROUND OF THE INVENTION (1) Field of Invention

The present invention relates to a system for managing a multi-user revision control repository and, more particularly, to a system for managing a multi-user revision control repository which provides multi-level access control.

(2) Description of Related Art

Revision control is the process of managing different revisions of a unit of information, such as a document (or collection of documents) or program source file (or collection of program source files). The greater the number of users of a repository and the larger the number of projects and sub-projects in a repository, the greater the need to effectively manage the repository. Typical revision control software, such as Concurrent Versions System (CVS), which is supported by Ximbiot LLC at 695 E. Square Lake Rd., Troy, Mich. 48085, and Subversion, which is distributed by CollabNet, Inc. located at 8000 Marina Boulevard, Suite 600, Brisbane, Calif. 94005, allows users to maintain and keep track of subsequent revisions of a collection of files. Both CVS and Subversion are distributed with a set of "sample" scripts which are meant to demonstrate how one would implement "hooks" for managing the repository. However, neither system provides a general and flexible setup for managing a repository. Additionally, other approaches use separate version control repositories for each group of users that require different levels of access. Due to the potential for both a large number of repository users and a large number of distinct projects and subprojects within a repository, there is a significant need for a system which effectively manages the repository.

Thus, a continuing need exists for a system for managing a multi-user revision control repository which provides multi-level access control of a hierarchy of management areas and management sub-areas.

SUMMARY OF THE INVENTION

The present invention relates to a system for management of a multi-user revision control repository comprising one or more processors that are configured to perform operations of creating a plurality of configuration files which describe a set of management states of a plurality of management areas of a repository. The plurality of configuration files describes access control to a set of management areas, and the set of management states is stored in the repository to create a self-hosting management implementation. A new commit is processed to the repository as a committed file by contacting a revision control repository server with a client software and communicating a user's new revision to the revision control repository server. Then, the user's authorization is verified prior to collecting a new revision with the revision control repository server. Finally the system executes a custom script configured to run on the revision control repository server, wherein the custom script comprises a post-commit script, and wherein the post-commit script is configured to perform a set of checks of at least one committed file containing the new revision to determine if the at least one committed file is a management file or a script file, such that if the at least one committed file is a management file or a script file, the system is configured to check out a copy of the file from the repository.

In another aspect, access to the plurality of configuration files is managed, allowing for the creation of a hierarchy of management areas and management sub-areas, such that a user managing a management area is able to delegate management of a management sub-area to another user.

In yet another aspect, the system further comprises a pre-commit script configured to perform a set of checks of at least one file containing the new revision and abort if a check fails, and if the pre-commit script did not abort, the revision control server commits the new revision to the repository as a committed file.

In another aspect, if the post-script itself is revised, then the post-script reexecutes to update according to the new revision.

In another aspect, if a management file is revised, the post-script updates the appropriate configuration file on the revision control repository server.

As can be appreciated by one in the art, the present invention also comprises a method for performing the operations described herein.

As can be appreciated by one in the art, the present invention also comprises a computer program product comprising computer-readable instruction means stored on a computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
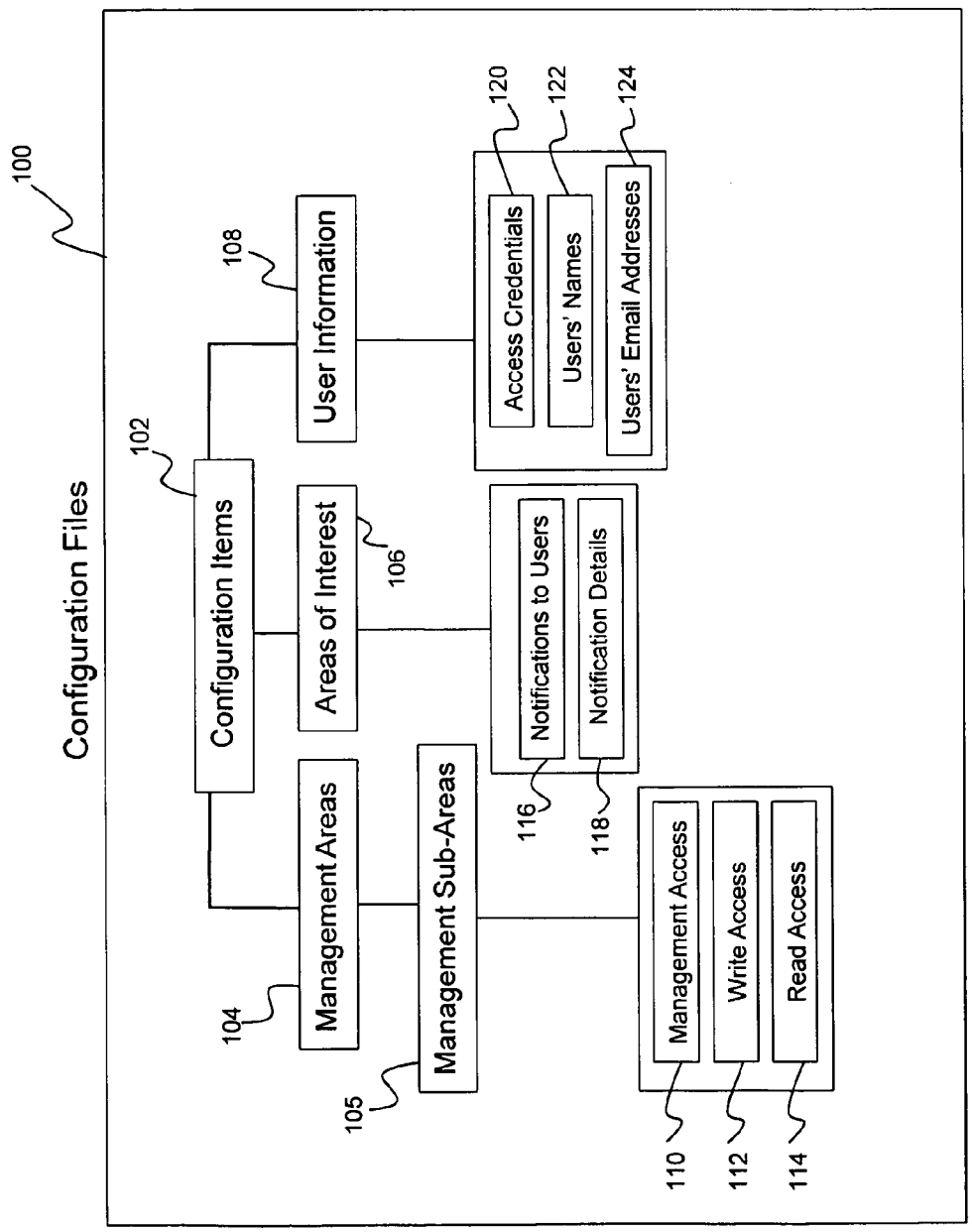
FIG. 1 is an illustration depicting the hierarchical organization of a multi-user revision control repository according to the present invention.

The present invention relates to a system for managing a multi-user revision control repository and, more particularly, to a system for managing a multi-user revision control repository which provides multi-level access control. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for management of a multi-user revision control repository. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for management of a multi-user revision control repository, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Introduction

Revision control is the process of managing different revisions of a unit of information, such as a document (or a collection of documents), a program source file (or a collection of program source files). Typical revision control software, such as CVS or Subversion, allows users to maintain and keep track of subsequent revisions of a collection of files by performing acts, such as "checking in" their changes to a repository, "checking out" changes (possibly made by other users) from the repository, retrieving information on past revisions, comparing revisions, and tracking revision history. Due to the potential for both a large number of repository users and a large number of distinct projects and subprojects within a repository, there is a significant need for a system which effectively manages the repository.

(3) Specific Details

The present invention addresses two important aspects of a management task, which are management of repository access controls and notifying users of relevant repository changes. Additionally, the present invention creates a "self-hosting" management implementation, which will be described in further detail below. The entire management state of the repository is stored in the repository itself. Management operations are performed by "checking out" and "checking in" new revisions of management files. "Checking out" refers to creating a local working copy from the repository. "Checking in" occurs when a copy of a revision made to the working copy is written or merged into the repository.

The invention described herein presupposes an existing revision control solution that is implemented as a central revision control repository with a server managing access to that repository. Non-limiting examples of revision control repository server software include Subversion and CVS. The approach to creating the management layer for a revision control repository described herein builds upon the ability of certain revision control server software, such as Subversion, to be configured to run custom scripts during the process of accepting a new revision being checked-in. In particular, the revision control server is relied upon for running a custom script just before accepting a new revision for check-in, with the ability for the script to reject the new revision and cause an error message to be given to the user. Additionally, the revision control server runs another custom script right after the new revision is accepted, or "committed," to the repository.

In a desired aspect, the present invention comprises several components. One component is a revision control server, a non-limiting example of which includes Subversion. It is assumed that the server is set up to authenticate its users. Additionally, custom "pre-commit" and "post-commit" scripts make up a component of the system. The implementation of the custom pre-commit and post-commit scripts in the present invention provides a distinction between the present invention and other deployments of revision control servers. The implementation of the custom scripts will be described in further detail below. In a desired aspect, the scripts themselves are checked into the repository, allowing the setup to be truly "self-hosting". This feature allows a repository administrator to use a familiar repository interface to further customize the scripts, as necessary. In another desired aspect, the repository server is configured to run each of the two scripts at the appropriate stage of the commit process.

As illustrated in FIG. 1, configuration files 100 describing management states of a repository form an additional component of the present invention. FIG. 1 illustrates a hierarchy of the possible contents of the configuration files 100, or configuration items 102. Non-limiting examples of the contents of the configuration files 100 include descriptions of different management areas 104 (or subareas 105) within the repository, descriptions of different areas of interest 106, and information regarding repository users 108 which is not available from external sources. Additionally, in another desired aspect, the configuration files 100 may be combined (e.g., areas of interest 106 may be combined with management areas 104). Therefore, for this non-limiting example, combining of configuration files 100 takes advantage of the fact that areas of interest and management areas do indeed often coincide.

Significantly, the configuration files 100 utilize a format which is understood by the pre/post-commit scripts. This aspect allows the use of a format that is easy to maintain and modify, rather than a format that the revision control server understands, which is typically verbose, fragile, and more difficult to maintain. Moreover, the use of a format which is understood by the pre/post-commit scripts allows the use of separate files for managing different repository areas, even where the server requires a single, monolithic file. One other consequence of using configuration files that may be processed by the pre/post-commit scripts is that the same revision control repository software used to manage user files may be used to manage the revision control repository software itself.

The content of the different management areas 104 within the repository, and who has access to each, include, but are not limited to, the following descriptions. "Management access" 110 gives a user an ability to regulate others' access to the management area 104. Furthermore, "Write access" 112 allows a user to view both the existing revisions of files in the management area 104, as well as commit new ones. Finally, "Read access" 114 gives a user an ability to view the existing revisions, but not to commit new ones.

The content of the different areas of interest 106 may include information such as notifications to users 116 for those who should be notified of changes (e.g., new commits) to the particular management area 104. Additionally, notification details 118, such as how notifications should refer to the area (e.g., area's "name"), may be included. It is also possible to use the present invention with different methods of managing the repository users, ranging from utilizing external user management (e.g., Unix password database, Lightweight Directory Access Protocol (LDAP)) to maintaining a completely independent set of user accounts for the revision repository and storing all the user information (e.g., names, access credentials). Non-limiting examples of user information 108 which may be stored include access credentials 120 (e.g., passwords, password hashes, public keys, certificates) indexed by users' logical names ("logins"), users' real names 122, and users' email addresses 124 and/or other contact information.

Regarding the use of real names 122 in notifications, the users' real names 122 are utilized since they are more readable than logical names (e.g., "John Doe has changed . . . " is more readable than "jdoe has changed . . . "). The stored contact information may also include the revision authors' contact information in notifications, so that a user receiving a notification knows how to contact the revision author. In addition, the author's email address may be included as a "From" and/or "Reply-To" field of the notification email message, so that responses to the notification can be automatically directed to the author.

In the present invention, it is assumed that the repository users have access to standard client software (non-limiting examples of which include Subversion (SVN) command-line client, TortoiseSVN, and RapidSVN, all distributed by CollabNet, Inc. located at 8000 Marina Boulevard, Suite 600, Brisbane, Calif. 94005). The client software does not need to be modified in any way to take advantage of the present invention, since the system described herein only modifies the server side of what is a fairly routine client-server setup. Additionally, the server software does not need to be modified in any way, since the only change is in how the server is configured and how the repository is structured. A non-limiting example of server software is CollabNet distributed by CollabNet, Inc. located at 8000 Marina Boulevard, Suite 600, Brisbane, Calif. 94005.

Figure 2:
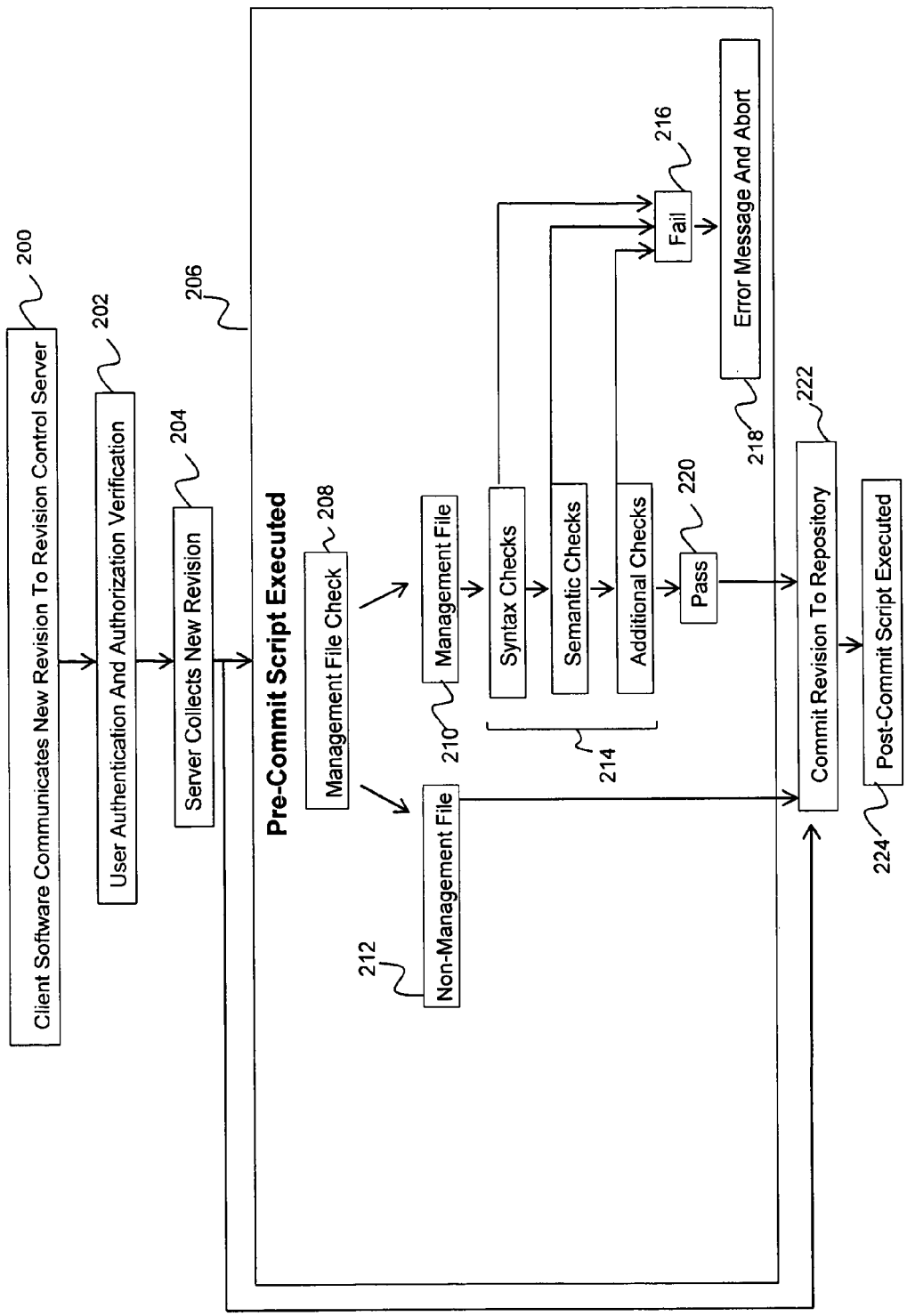
FIG. 2 is a flow diagram depicting processing of a new commit to a multi-user revision control repository according to the present invention.

While the present invention functions as a routine client-server revision control setup with user authentication and authorization, the invention differs from a routine client-server setup in the manner in which it processes new commits to the repository. In a desired aspect, the present invention processes commits as shown in FIG. 2. However, the process illustrated is only provided as an example and alternative ordering of the steps of the process may be implemented. First, the client software contacts the server and communicates the new revision to the server 200. Based on its current authentication and authorization information, the server verifies that the user has permission to make the revision it requests 202. Then, the server collects the new revision 204 and executes the pre-commit script 206. The custom pre-commit script 206 performs a set of checks 208 to determine if any of the files being modified, which includes files being added or deleted, is a management file 210 or a non-management file 212.

For each of the modified management files 210, the pre-commit script 206 ensures that the file is free of errors through a set of checks 214. Non-limiting examples of checks include syntax checks and semantic checks, as appropriate for the particular file. For instance, semantic checks may determine if the management areas that the file refers to exist in the repository. Additionally, the checks 214 may determine if the users that the file refers to exist in a user database. The custom pre-commit script 206 may also perform checks needed to ensure that the commit satisfies repository policies. For example, the pre-commit script 206 may check that the log message that accompanies the commit is not empty and is not one of the default log messages used by the client software (e.g., TortoiseSVN). This partially enforces a requirement for a "meaningful" log message. If any of the checks fail 216, the pre-commit script formats an appropriate error message and aborts 218. Provided the pre-commit script 206 did not abort 218 and passed 220 the various checks, the server then commits the revision to the repository 222, makes whatever additional checks are necessary, and then executes the post-commit script 224. Alternatively, the pre-commit script 206 is optional. In this aspect, the system is configured to process a new commit and execute the post-commit script 224 without executing the pre-commit script 206.

Figure 3:
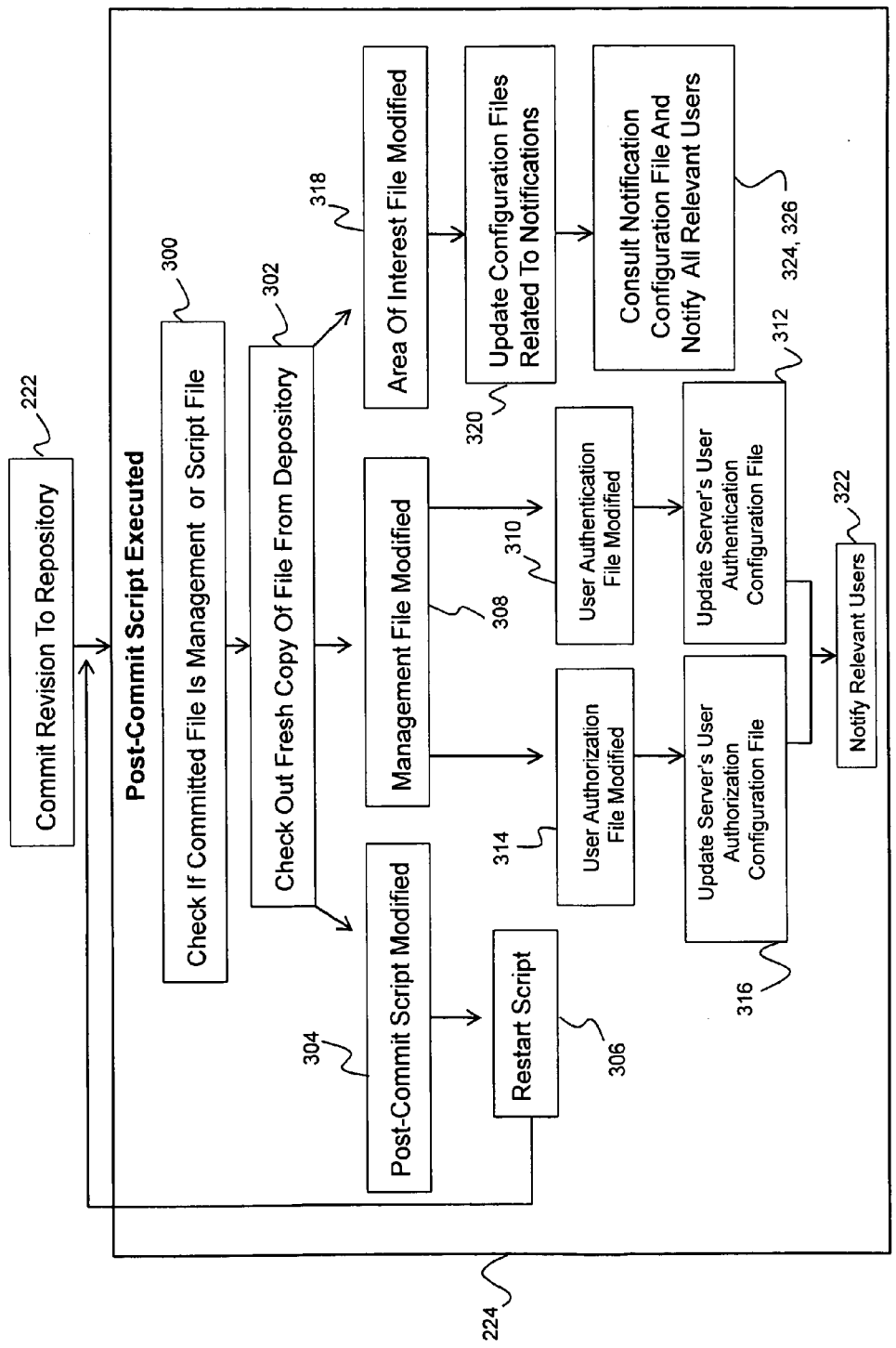
FIG. 3 is a flow diagram depicting a post-commit script according to the present invention.

FIG. 3 depicts a flow diagram of the post-commit script 224. As shown, the custom post-commit script 224 first determines if any of the files that were committed are management files or script files 300, such as pre-commit scripts, post-commit scripts, or modules used by those scripts. If the committed files are management or script files, then the custom post-commit script checks-out the fresh copies of those files from the repository 302 in its own dedicated checkout area to create a "working copy". Alternatively, the custom post-commit script 224 may not check-out a fresh copy of the file. A private working copy may already exist prior to the execution of the post-commit scripts 224 (e.g., as a result of either an administrator setting it up in advance or a previous execution of the script). In such a case, the script only needs to update the existing working copy to the version that was just committed. Thus, the scripts maintain their own private working copy of the management and script files on the repository server.

The repository server software, which is independent of the scripts, normally expects the scripts and configuration files to reside in a certain location. In a desired aspect, a symbolic link is placed at the expected location, which points to the corresponding location in the working copy. The symbolic link approach provides more flexibility than the typical approach. However, as can be appreciated by one skilled in the art, the working copy may also reside at the expected location. Therefore, it can be ensured that for those script and configuration files that are made "self-hosted" in the repository, the repository server software will always automatically use the latest versions checked-out of the repository.

If the post-commit script 224 itself (or any of the modules it uses) is modified 304, then the script, which is running the previous version, restarts to take advantage of any changes made 306. In addition, the restarted script is notified that it needs to skip the previous steps described for the post-commit script above. In a desired aspect, in order to determine which files are related to scripts, all of the files related to functioning of the scripts and of the repository server (including any server configuration files that are checked-into the repository itself) are located under a ".Setup" subdirectory of a repository root. As can be appreciated by one skilled in the art, the name ".Setup" is an arbitrary selection, and any suitable name could be used provided it is used consistently and that the naming convention is known to those users who need access to the files.

The approach implemented in the present invention allows simple restriction of access to script and configuration files to repository administrators by giving only the repository administrators the access to the ".Setup" directory. Note that as the authorization configuration for the server is being generated by the post-commit script, this limitation needs to be present either in the management files for the "root" administrative area of the repository or in the management files for the ".Setup" directory, provided this directory is made into a separate management area.

In order to determine if committed files are management files, the approach is similar to that described for script and configuration files. For the "root" management area, all of the management files reside in an ".Admin" subdirectory of the root repository directory. Again, the name choice for the directory is arbitrary and any suitable name could be used. The management files which reside in the ".Admin" subdirectory specify which management subareas exist in the repository, where each management subarea is a specific directory under the area root (where the root of the "root" area is the repository root). Each of those subareas could then have its own ".Admin" directory with its own management files, which, in turn, may define further subareas.

The names of particular files in the ".Admin" subdirectories need to follow a specific naming convention that would be known to the scripts and to the area managers. For example, in the current implementation, the following names are used: "auth.conf" for the authorization management file and "TechnicalAreas.txt" for the subareas management file. Note that the managers do not have to remember the exact names of these files, since whenever a new subarea is created, the initial files will be added automatically by the scripts. Additionally, each ".Admin" subdirectory is equipped with a read me text (README.txt) file that explains the meaning of all the management files.

The "management"-level access is implemented simply as access controls on the ".Admin" subdirectories. When the authorization configuration file for the server is generated out of the management files describing the areas and authorization to the management files, the users who should have the "management" access to an area will get read-write access to the ".Admin" directory. The users who should have the normal read-write or read-only access would be given access to all the regular files in the area, but will be explicitly excluded from having access to the ".Admin" subdirectory.

As illustrated in FIG. 3, for any management file that was modified 308, the post-commit script 224 then performs the appropriate action. For example, if any files related to a description of user authentication is modified 310, then the script 224 would update (or regenerate) the server's user authentication configuration file 312. Likewise, if any files related to user authorization is modified 314, the script 224 would update (or regenerate) the server's user authorization configuration file 316. Furthermore, if a file enumerating repository management areas (or subareas of an existing management area) is modified though the addition of new areas or subareas, the script 224 would then create any of the new areas/subareas that do not already exist in the repository.

It is likely that a follow-up repository commit would then need to be performed after the creation of new areas/subareas. Additionally, as some implementations do not allow a new commit while a post-commit script is still running, these follow-up commits would need to be performed in a background "daemon" subprocess that performs these actions after the main post-commit script is finished. Finally, if a file describing the "areas of interest" is modified 318, the script 224 updates (or regenerates) its own configuration files related to notifications 320.

In a desired aspect, for all of the actions performed for management files by the post-commit script 224 described above, the post-commit script 224 notifies the relevant parties 322. The notion of relevant parties 322 can be defined by a combination of administrative policies (e.g., hardcoded into the post-commit script) and the regular notification configuration via "areas of interest". For instance, if a user's access permissions have changed, the post-commit script 224 is used to notify the user by sending an e-mail describing the changes. As another non-limiting example, if access permissions have changed within a certain management area of the repository, the area managers are notified by sending an e-mail describing the changes and also listing the full access permissions for the area. Additionally, if a new area or subarea is created, the proper managers, both the managers of the new subarea and the managers of the "parent" area, are notified. Furthermore, avoiding unnecessary notifications is nearly as important as including the necessary ones; therefore, the script filters out "spurious notifications". As a non-limiting example, an area which was previously open to all repository users may be made private, or vice versa. The script 224 avoids sending notifications to all users, such that only the users specifically affected and area administrators are notified. Finally, for all of the files checked into the repository, the post-commit script 224 consults its notification configuration file to determine which areas of interest the files fall into 324. For each area of interest that was affected by the commit, each of the relevant parties are then notified 326 (e.g., via e-mails or any other suitable form of communication).

Figure 4:
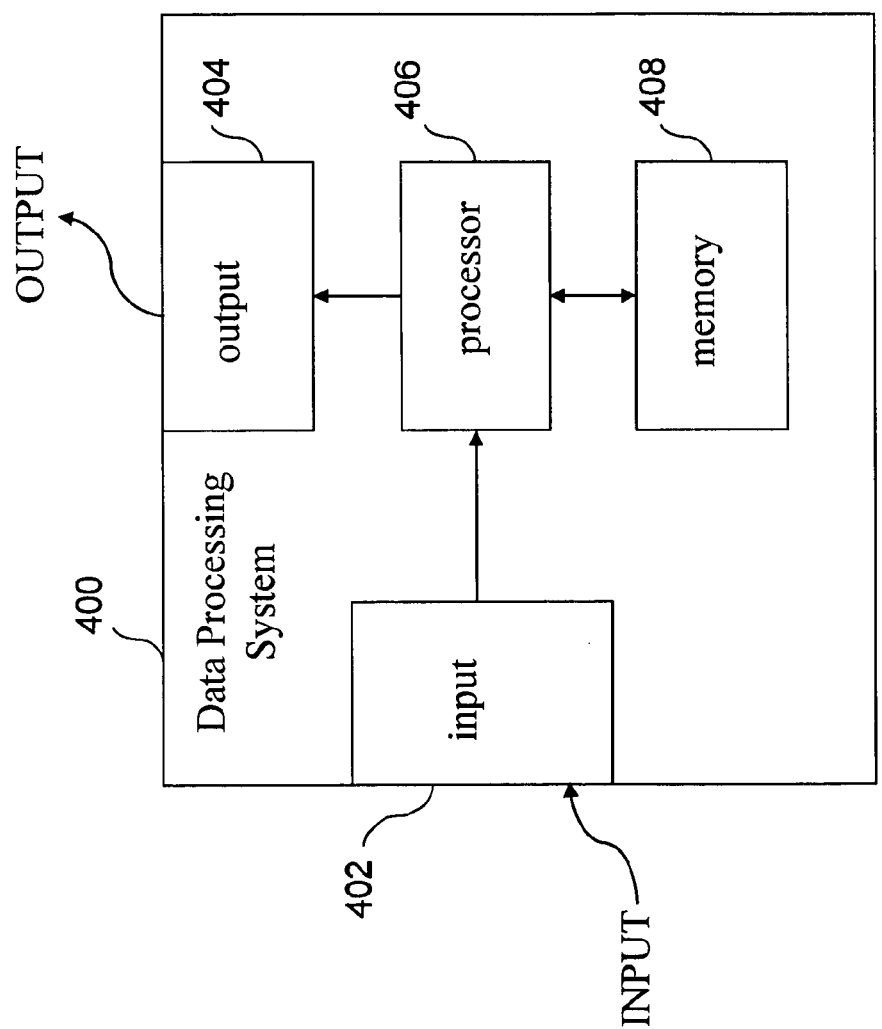
FIG. 4 is an illustration of a data processing system according to the present invention.

FIG. 4 illustrates a block diagram depicting components of a data processing system 400 (e.g., computer) incorporating the operations of the method described above. The method utilizes a data processing system 400 for storing computer executable instruction means for causing a processor (or processors) to carry out the operations of the above described method. The data processing system 400 comprises an input 402 for receiving information from a user. Information received may include input from devices such as cameras, scanners, keypads, keyboards, microphone, other peripherals such as storage devices, other programs, etc. The input 402 may include multiple "ports." An output 404 is connected with a processor 406 for providing information for transmission to other data processing systems, to storage devices, to display devices such as monitors, to generating information necessary for delivery, and to other mechanisms for presentation in user-usable forms. The input 402 and the output 404 are both coupled with the processor 406, which may be a general-purpose computer processor or a specialized processor designed specifically for use with the present invention. The processor 406 is coupled with a memory 408 to permit storage of data and software to be manipulated by commands to the processor 406.

Figure 5:
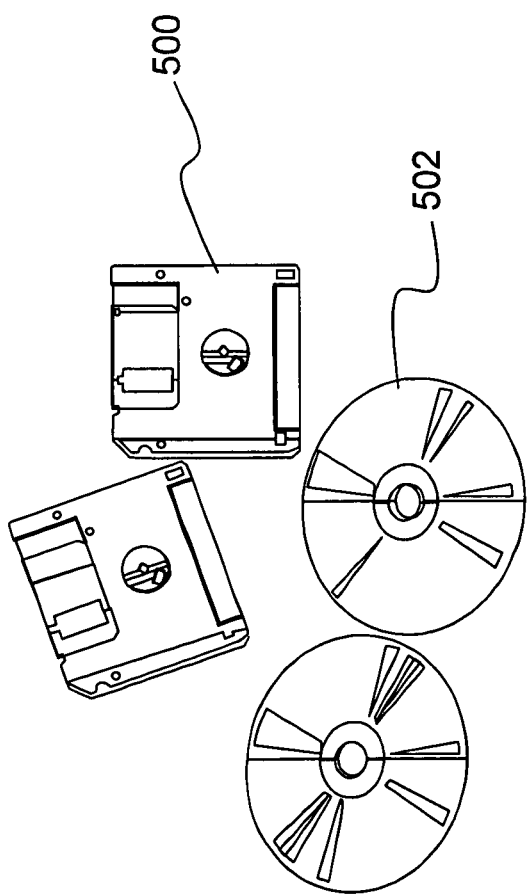
FIG. 5 is an illustration of a computer program product according to the present invention.

An illustrative diagram of a computer program product embodying the present invention is depicted in FIG. 5. As a non-limiting example, the computer program product is depicted as either a floppy disk 500 or an optical disk 502. However, as mentioned previously, the computer program product generally represents instruction means (i.e., computer readable code) stored on any compatible computer readable medium.

What is claimed is:

1. A system for management of a multi-user revision control repository having a revision control repository server, the system comprising one or more processors that are configured to perform operations of:
   creating a plurality of configuration files which describe a set of management states of a plurality of management areas of a repository, wherein the plurality of configuration files describe access control to a set of management areas, and wherein the plurality of configuration files is stored in the repository;
   processing a new commit to the repository as a committed file, wherein in the act of processing the new commit, the system is further configured to perform operations of:
      contacting a revision control repository server with a client software;
      communicating a user's new revision to the revision control repository server;
      verifying the user's authorization prior to collecting a new revision with the revision control repository server,
      executing a custom script configured to run on the revision control repository server, wherein the custom script comprises a post-commit script, and wherein the custom script is stored in the repository;
      performing, with the custom script, a set of checks of at least one committed file containing the new revision; and
      using the custom script to determine whether the at least one committed file is a management file or a script file, such that if the at least one committed file is a management file or a script file then the system is configured to check out a copy of the committed file from the repository;
   wherein the new commit is used to manage the repository to provide multi-level access control of the set of management areas.

2. The system for management of a multi-user revision control repository as set forth in claim 1, wherein access to the plurality of configuration files is managed, allowing for the creation of a hierarchy of management areas and management sub-areas, such that a user managing a management area is able to delegate management of a management sub-area to another user.

3. The system for management of a multi-user revision control repository as set forth in claim 2, further comprising a pre-commit script configured to perform a set of checks of at least one file containing the new revision and abort when a check fails, and when the pre-commit script does not abort, the revision control server commits the new revision to the repository as a committed file, then executes the post-commit script.

4. The system for management of a multi-user revision control repository as set forth in claim 3, wherein when the post-script itself is revised, then the post-script reexecutes to update according to the new revision.

5. The system for management of a multi-user revision control repository as set forth in claim 4, wherein when a management file is revised, the post-script updates the appropriate configuration file on the revision control repository server.

6. The system for management of a multi-user revision control repository as set forth in claim 1, further comprising a pre-commit script configured to perform a set of checks of at least one file containing the new revision and abort when a check fails, and when the pre-commit script does not abort, the revision control server commits the new revision to the repository as a committed file, then executes the post-commit script.

7. A computer-implemented method for management of a multi-user revision control repository having a revision control repository server, the method comprising an act of causing a processor to perform operations of:
   creating a plurality of configuration files which describe a set of management states of a plurality of management areas of a repository, wherein the plurality of configuration files describe access control to a set of management areas, and wherein the plurality of configuration files is stored in the repository;
   processing a new commit to the repository as a committed file, wherein in the act of processing the new commit, the system is further configured to perform operations of:
      contacting a revision control repository server with a client software;
      communicating a user's new revision to the revision control repository server;
      verifying the user's authorization prior to collecting a new revision with the revision control repository server; and
      executing a custom script configured to run on the revision control repository server, wherein the custom script comprises a post-commit script, and wherein the custom script is stored in the repository;
      performing, with the custom script, a set of checks of at least one committed file containing the new revision; and
      using the custom script to determine whether the at least one committed file is a management file or a script file, such that if the at least one committed file is a management file or a script file then the system is configured to check out a copy of the committed file from the repository;
   wherein the new commit is used to manage the repository to provide multi-level access control of the set of management areas.

8. The method for management of a multi-user revision control repository as set forth in claim 7, wherein access to the plurality of configuration files is managed, allowing for the creation of a hierarchy of management areas and management sub-areas, such that a user managing a management area is able to delegate management of a management sub-area to another user.

9. The method for management of a multi-user revision control repository as set forth in claim 8, further comprising an act of executing a pre-commit script configured to perform a set of checks of at least one file containing the new revision and abort when a check fails, and when the pre-commit script does not abort, the revision control server commits the new revision to the repository as a committed file, then executes the post-commit script.

10. The method for management of a multi-user revision control repository as set forth in claim 9, wherein when the post-script itself is revised, then the post-script reexecutes to update according to the new revision.

11. The method for management of a multi-user revision control repository as set forth in claim 10, wherein when a management file is revised, the post-script updates the appropriate configuration file on the revision control repository server.

12. The method for management of a multi-user revision control repository as set forth in claim 7, further comprising an act of executing a pre-commit script configured to perform a set of checks of at least one file containing the new revision and abort when a check fails, and when the pre-commit script does not abort, the revision control server commits the new revision to the repository as a committed file, then executes the post-commit script.

13. A computer program product for management of a multi-user revision control repository having a revision control repository server, the computer program product comprising:
   computer-readable instruction means stored on a non-transitory computer-readable medium that are executable by a computer having a processor for causing the processor to perform operations of:
      creating a plurality of configuration files which describe a set of management states of a plurality of management areas of a repository, wherein the plurality of configuration files describe access control to a set of management areas, and wherein the plurality of configuration files is stored in the repository;
      processing a new commit to the repository as a committed file, wherein in the act of processing the new commit, the computer program product further comprises instruction means for:
      contacting a revision control repository server with a client software;
      communicating a user's new revision to the revision control repository server;
      verifying the user's authorization prior to collecting a new revision with the revision control repository server; and
      executing a custom script configured to run on the revision control repository server, wherein the custom script comprises a post-commit script, and wherein the custom script is stored in the repository;
      performing, with the custom script, a set of checks of at least one committed file containing the new revision; and
      using the custom script to determine whether the at least one committed file is a management file or a script file, such that if the at least one committed file is a management file or a script file then the system is configured to check out a copy of the committed file from the repository;
   wherein the new commit is used to manage the repository to provide multi-level access control of the set of management areas.

14. The computer program product for management of a multi-user revision control repository as set forth in claim 13, wherein access to the plurality of configuration files is managed, allowing for the creation of a hierarchy of management areas and management sub-areas, such that a user managing a management area is able to delegate management of a management sub-area to another user.

15. The computer program product for management of a multi-user revision control repository as set forth in claim 14, further comprising instruction means for executing a pre-commit script configured to perform a set of checks of at least one file containing the new revision and abort when a check fails, and when the pre-commit script does not abort, the revision control server commits the new revision to the repository as a committed file, then executes the post-commit script.

16. The computer program product for management of a multi-user revision control repository as set forth in claim 15, wherein when the post-script itself is revised, then the post-script reexecutes to update according to the new revision.

17. The computer program product for management of a multi-user revision control repository as set forth in claim 16, wherein when a management file is revised, the post-script updates the appropriate configuration file on the revision control repository server.

18. The computer program product for management of a multi-user revision control repository as set forth in claim 13, further comprising instruction means for executing a pre-commit script configured to perform a set of checks of at least one file containing the new revision and abort when a check fails, and when the pre-commit script does not abort, the revision control server commits the new revision to the repository as a committed file, then executes the post-commit script.

* * * * *